(12) United States Patent
Pleasant et al.

(10) Patent No.: US 6,496,079 B1
(45) Date of Patent: Dec. 17, 2002

(54) OPTICAL TO MICROWAVE CONVERTER USING DIRECT MODULATION PHASE SHIFT KEYING

(75) Inventors: Wayne E. Pleasant, Turners Falls, MA (US); Joseph Chandler, Northampton, MA (US)

(73) Assignee: Telaxis Communications Corporation, South Deerfield, MA (US)

( * ) Notice: Subject to any disclaimer, the term of this patent is extended or adjusted under 35 U.S.C. 154(b) by 1 day.

(21) Appl. No.: 09/863,027

(22) Filed: May 22, 2001

(51) Int. Cl.[7] .............................................. H03C 3/00
(52) U.S. Cl. ......................................... 332/103; 375/308
(58) Field of Search ................................. 332/103, 104, 332/105; 375/308

(56) References Cited

U.S. PATENT DOCUMENTS 5,222,103 A * 6/1993 Gross ........................... 375/54

* cited by examiner

Primary Examiner—David Mis
(74) Attorney, Agent, or Firm—Hamilton Brook Smith & Reynolds, P.C.

(57) ABSTRACT

A point-to-point microwave radio link that operates in a Frequency Division Duplex (FDD) mode using direct digital modulation with a Continuous Phase Shift Keyed (PSK) scheme. The transmit signal is generated by a circuit that uses a Voltage-Control Oscillator (VCO) operating in a microwave radio band to obtain the modulated signal. The VCO output is fed to a phase modulator to obtain the modulated signal. The output of the VCO is then frequency multiplied by the predetermined factor to produce the modulated microwave output signal at the desired band.

10 Claims, 4 Drawing Sheets

DIRECT MODULATION QPSK TRANSMITTER 100

DIRECT MODULATION QPSK TRANSMITTER 100

TECHNIQUE FOR DIRECT MODULATION 151

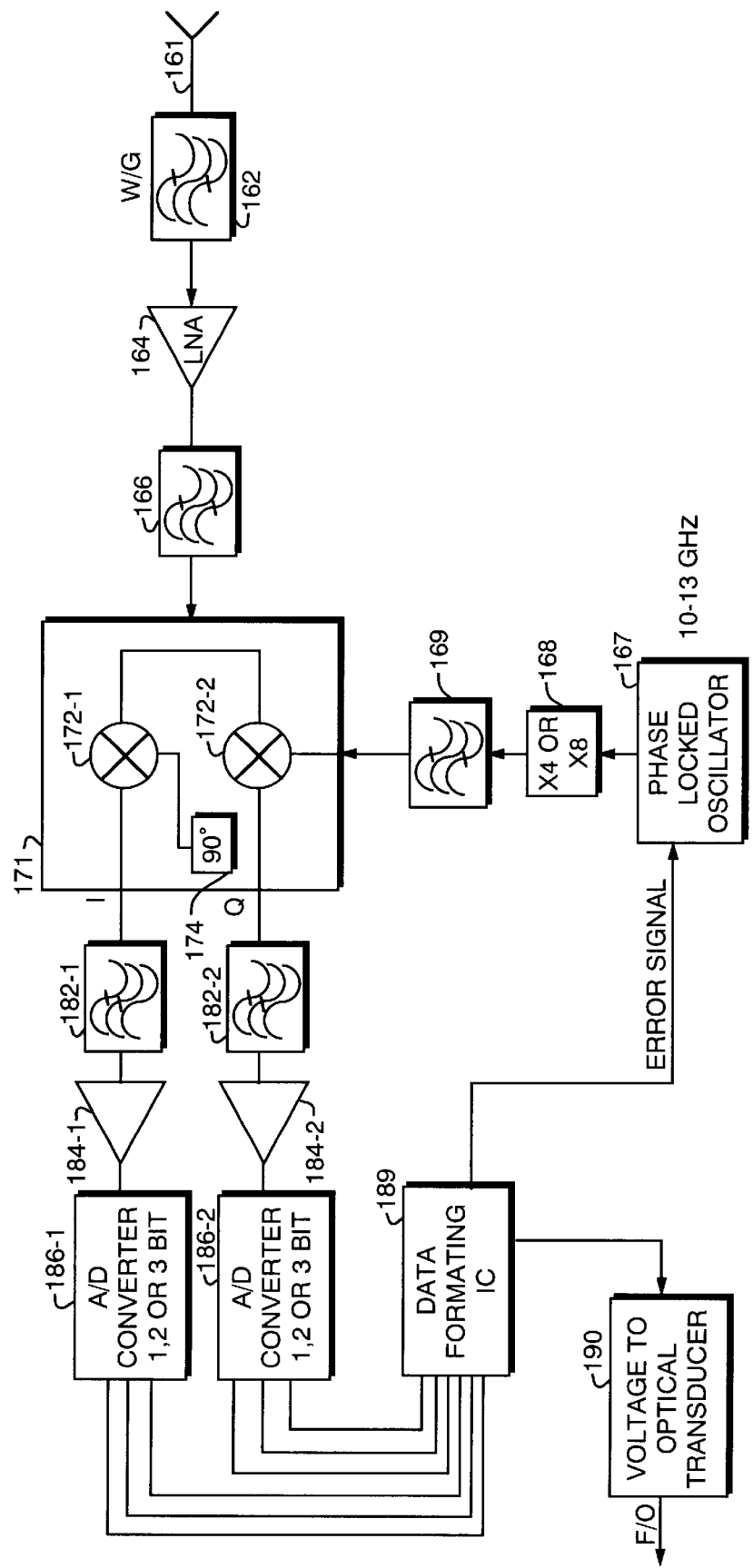

OPTICAL TO MICROWAVE CONVERTER USING DIRECT MODULATION PHASE SHIFT KEYING

BACKGROUND OF THE INVENTION

The need to transport high-bandwidth signals from place to place continues to drive growth in the telecommunications industry. As the demand for high-speed access to data networks, including both the Internet and private networks, continues to evolve, network managers face an increasing need to transport data signals over short distances. For example, in corporate campus environments, it is often necessary to implement high-speed network connections between buildings rapidly and inexpensively, without incurring commitments for long-term service contracts with local telephone companies. Other needs occur in residential areas, including apartment buildings, and even private suburban neighborhoods. Each of these settings requires efficient distribution of high-speed data signals to a number of locations.

An emerging class of products provides a broadband wireless access solution via point-to-point communication links over radio carrier frequencies in the microwave radio band. The telecommunications transport signals may be provided on a wire, but increasingly, these are provided on optical fiber media. An optical to electrical conversion stage is thus first required to convert the baseband digital signal. Next, a microwave frequency radio is needed to up-convert the broadband digital signal to a suitable radio carrier frequency. These up-converters are typically implemented using multi-stage heterodyne receivers and transmitters such that the input baseband signal is modulated and then up-converted to the desired radio frequency. In the case of an OC-3 rate optical transport signal having a bandwidth of 155 MegaHertz (MHz), the input signal may be up converted to an ultimate microwave carrier of, for example, 23 GHz, through several Intermediate Frequency (IF) stages at lower radio frequencies.

Other implementations may use optical technologies to transport the signal over the air. These technologies use optical emitters and detectors operating in the high infrared range. While this approach avoids conversion of the optical input to an electrical signal, it has certain limitations. First, the light wave carrier has a narrow beamwidth, meaning that the transmitter and receiver must be carefully aligned with one another. Light wave carriers are also more susceptible to changes in physical conditions. These changes may be a result of changes in sunlight and shade exposure, or foreign material causing the lenses to become dirty over time. Other problems may occur due to vibrations from nearby passing automobiles and heating ventilating and cooling equipment. Some members of the public are concerned with possible eye damage from high powered lasers.

SUMMARY OF THE INVENTION

The present invention is a point-to-point microwave radio link that operates in a Frequency Division Duplex (FDD) mode using separate microwave band radio frequency carriers for each direction. The transmitter uses direct digital modulation to convert an input baseband optical rate signal to the desired microwave frequency carrier. The design may be targeted for operation at unallocated frequencies in the millimeter wave spectrum, such from 40–320 GHz.

The direct digital modulation is implemented using a Phase Shift Keyed (PSK) scheme. The PSK signal is generated at the transmitter by a circuit that uses a stable voltage controlled oscillator operating in the 10–13 GHz band. The oscillator output is first up-converted to the desired microwave range. For operation in the 40–52 GHz range, this may be a single stage times four (×4) frequency multiplier for operation at a higher range, such as from 81–87 GHz, a second, times two (×2) multiplier may also be employed.

The frequency multiplier feeds a phase modulator and/or attenuator circuit. In particular, the frequency multiplier output is fed to a phase modulator that deviates the phase by a desired amount. The phase deviator may be one or more circulators in a preferred embodiment. A bandpass filter and power amplifier may typically be inserted prior to the phase shifter.

If amplitude modulation is also desired, an attenuator may be inserted in-line prior to the phase deviator. This allows multi-level modulation schemes such as QAM to be employed.

The receiver uses a similar but inverse signal chain consisting of a microwave oscillator, frequency multiplier, and bandpass filter. A single down conversion stage is all that is required. By inserting the frequency multiplier between the oscillator and down converter mixer, the local oscillator remains offset by a wide margin from the input RF carrier frequency. This permits the receiver image reject filters to be implemented more easily.

While the direct digital modulation approach is not necessarily bandwidth-efficient, it provides a low cost alternative to traditional approaches, since the base band modem and multiple RF stages are eliminated. Because there are no heterodyne stages, there also are no images of the modulated baseband signals created on either side of the carrier frequency. Thus, image reject filters are not necessary.

Direct digital modulation also only creates modulation artifacts at high multiples of the VCO center frequency. This allows the output bandpass filters to be implemented using inexpensive waveguide technologies that can easily reject the harmonics of the VCO output, as opposed to more stringent filters that might otherwise be required to reject the harmonics of the baseband signal.

BRIEF DESCRIPTION OF THE DRAWINGS

FIG. 4 is a detailed circuit diagram of a Direct Modulation receiver.

Figure 1:
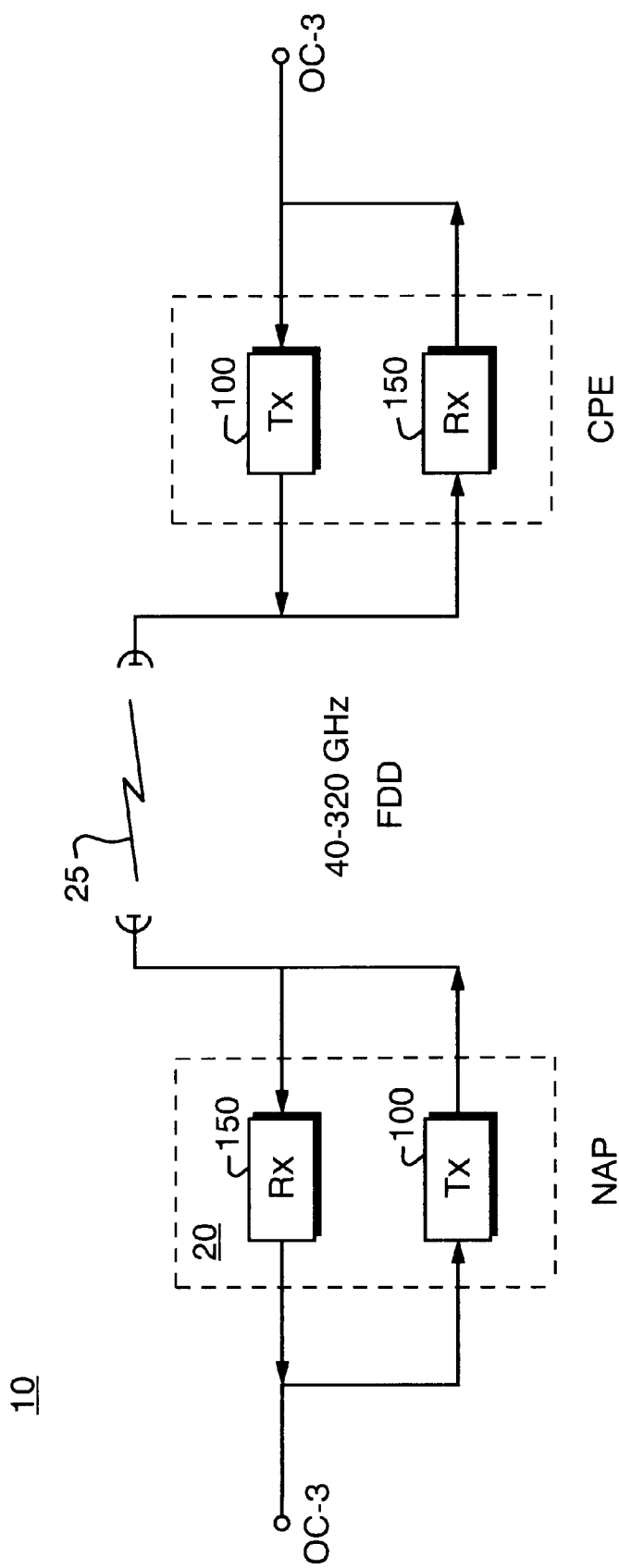
FIG. 1 is a block diagram of a point-to-point, optical to microwave link according to the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

FIG. 1 is a block diagram of a point-to-point wireless communications system that may make use of a direct conversion transmitter and receiver according to the invention. The system 10 includes at least a pair of optical-to-microwave link interfaces 20, 30. A first optical-to-microwave link interface may be located, for example, at a central location such as a Network Access Point (NAP) 20 that provides connections to a data network. In the illustrated example, the network connection is provided from an optical fiber that carriers a transport signal modulated in accordance with the OC-3 standard signaling format. The OC-3 optical signal carries an information signal having a data rate of 155.22 Megabits per second (Mbps). A similar optical-to-microwave converter unit 30 is located at another remote location, such as a Network Termination Point (NTP). The unit 30 also provides connectivity to a similar OC-3 optical transport connection. The units 20, 30 may, for example, be located on the roofs of buildings in a campus environment to which it is desired to provide high-speed network connections between buildings.

In any event, both units 20 and 30 each have a transmitter 100 and receiver 150. The transmitter 100 and receivers 150 operate in a Frequency Division Duplex (FDD) mode, such that transmitter-receiver pairs operate on distinct carrier frequencies. For example, in a downlink direction from unit 20 towards unit 30, the transmitter 100 in unit 20 operates on the same microwave carrier frequency to which the receiver 100 in unit 30 is tuned. Likewise, the receiver 150 in unit 20 is tuned to the microwave carrier which the transmitter 100 in unit 30 operates.

Acceptable operating frequencies for the uplink and downlink may be in an unlicensed microwave band. For example, in the United States, appropriate unlicensed microwave radio bands occur in the various regions of the 40 to 320 GHz band.

It should be understood that the units 20 and 30 may be deployed at any short haul point-to-point locations, such that the specific locations are in effect network peers. It should also be understood that the invention may be used to carry data traffic between different types of locations and different types of network traffic.

Figure 2:
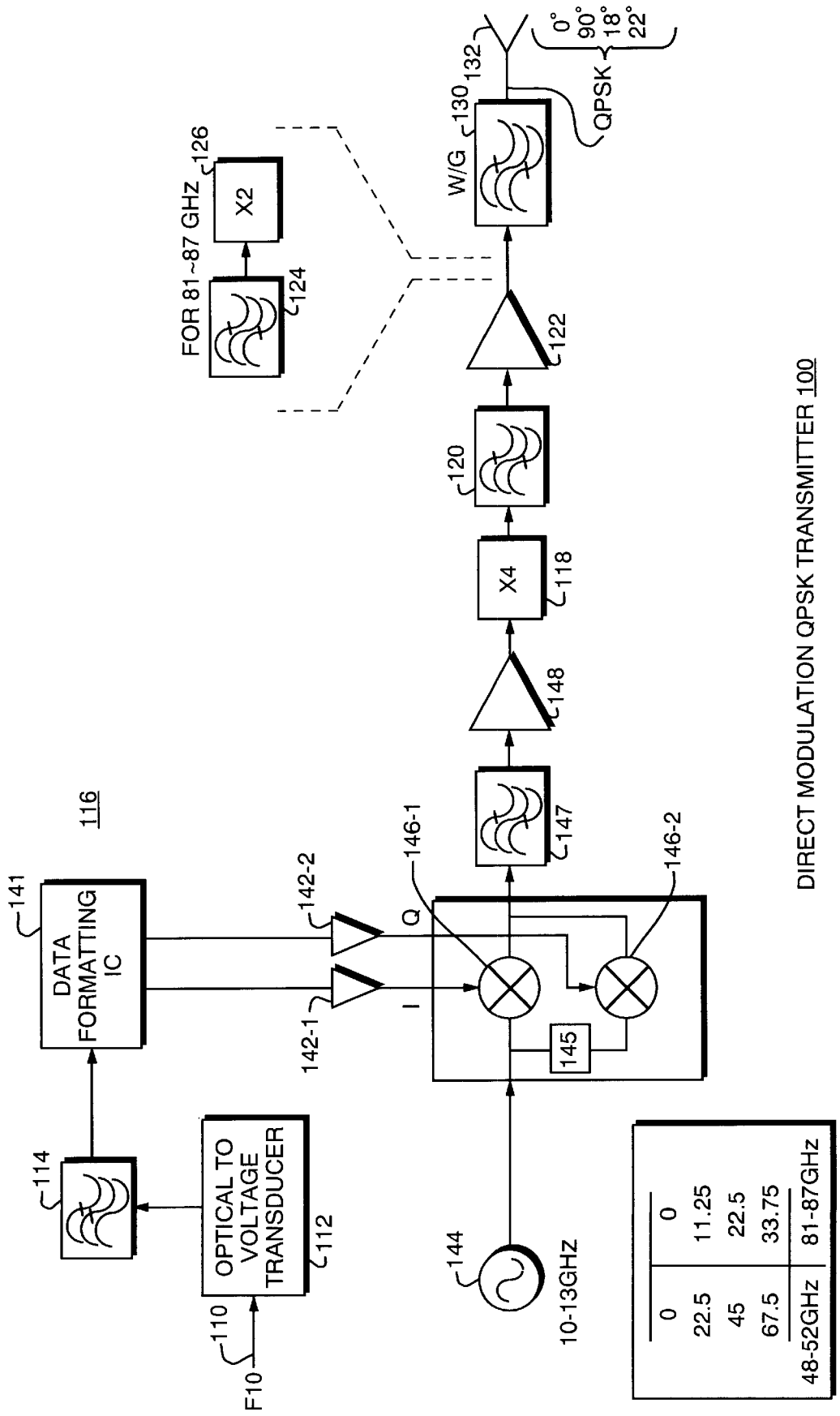
FIG. 2 is a detailed circuit diagram of a Direct Modulation transmitter that may be used in the link.

Turning attention now to FIG. 2, an exemplary transmitter 100 will be described in greater detail. The transmitter includes an optical to voltage transducer 112, a baseband filter 114, and a direct phase modulator 116. The circuit also utilizes a multiplier 118, a bandpass filter 120, a buffer amplifier 122, an output waveguide filter 130, and a transmit antenna 132. Optionally, a second-stage bandpass filter 124 and multiplier 126 may be utilized. The direct phase modulator 116 includes a data formatting integrated circuit (IC) 141, a pair of buffers 142-1, 142-2, a local oscillator 144, a phase shifter 145, a pair of phase modulators 146-1, 146-2, a bandpass filter 147. As will be understood shortly, the signal radiated by the transmitter 100 has a continuous phase and employs Quadrature Phase Shift Keyed (QPSK) modulation in order to communicate information to the receiver 150.

The frequency of the local oscillator 144 is determined by the multiplication factor implemented by the following multiplier 118, and possibly 126. For example, given an OC-3 input signal and a desired output signal in the range of 48–52 GHz, the carrier signal output by the modulator 116 may be in the range of from 10–13 GHz. The oscillators used in the VCO 144 are therefore not particularly narrow band or stable at such high operating ranges in the 40 GHz and above range. Thus, the approach here is to use a more stable VCO 144 source at a lower range, such as in the 10–13 GHz range, and then to rely upon the multiplier 118 and/or 126 to shift the VCO output up to the desired operating band.

The first-stage bandpass filter 120 removes artifacts of the direct modulation process. Unlike heterodyne receivers, no sidebands are created. Artifacts of the direct modulation process occur only at multiples of the VCO 144 carrier and not at image frequencies and no RF sidebands are generated. Thus, the first-stage bandpass filter 120 need only remove the 10–13 GHz range harmonics on either side of the output 50 GHz range carrier frequency. It therefore need not be a particularly sharp roll off filter.

A medium range buffer amplifier 122 then receives the filtered signal and forwards it to an output waveguide filter 130.

The waveguide filter 130 further reduces the harmonics of the VCO 144. It need not be an image-reject filter. Such image-reject filters, if they were needed, would further increase the cost. Elimination of the heterodyne stages, while not providing as bandwidth efficient an approach, does produce a less expensive radio.

The input OC-3 formatted optical signal is fed to the optical to voltage transducer 112. The transducer 112 produces at its output a raw transport bitstream. For an input optical signal of the OC-3 format, the transport bit stream is a digital signal at a 155.22 Mbps rate. The raw transport bit stream is then fed to a lowpass filter 114 to remove any artifacts of the optical to voltage conversion process. It should be understood that other digital input signal types may be supported, such as OC-1, OC-12 or other optical range transport signals.

After being converted to a voltage from the optical carrier, the input baseband signal is directly fed to the control inputs of the data formatter 141. For QPSK operation, the data formatter 141 drives the phase modulator 116 only. The phase modulator 116 provides a phase-deviated microwave carrier at its output, which shifts in phase according to the logic state of the input transport signal.

The phase modulation circuit is provided by feeding the data bits output by the formatter 141 to a Digital to Analog (D/A) converter 151 and a pair of PIN diodes 152 and 153. The generated microwave carrier signal is then fed from the waveguide filter 130 to a PIN attenuator 154 which in turn feeds a pair of circulators 155 and 156. The signal output from the circulator 156 is then fed to the antenna 132.

The combination of the PIN diodes 152 and 153 and circulators 155 and 156 implement one of four different phase shifts, as controlled by the least significant data bits 150-1 and 150-2 output by the formatter 141. These two least significant data bits are fed to a respective one of the PIN attenuators 152 and 153. They implement a 0 or 90 degree phase shift, in the case of the PIN attenuator 152, and a 0 or 180 degree phase shift, in the case of PIN attenuator 153. Thus, it can be considered that a first one of the PIN diodes implements a first phase shift, P1, and a second 153 implements a phase shift, P2. The PIN diodes 152 and 153 reflect the input signal into either of two phases, e.g. into either one of two signal paths, and the reflected signal is then fed out to the respective one of the circulators 155 and 156.

Figure 3:
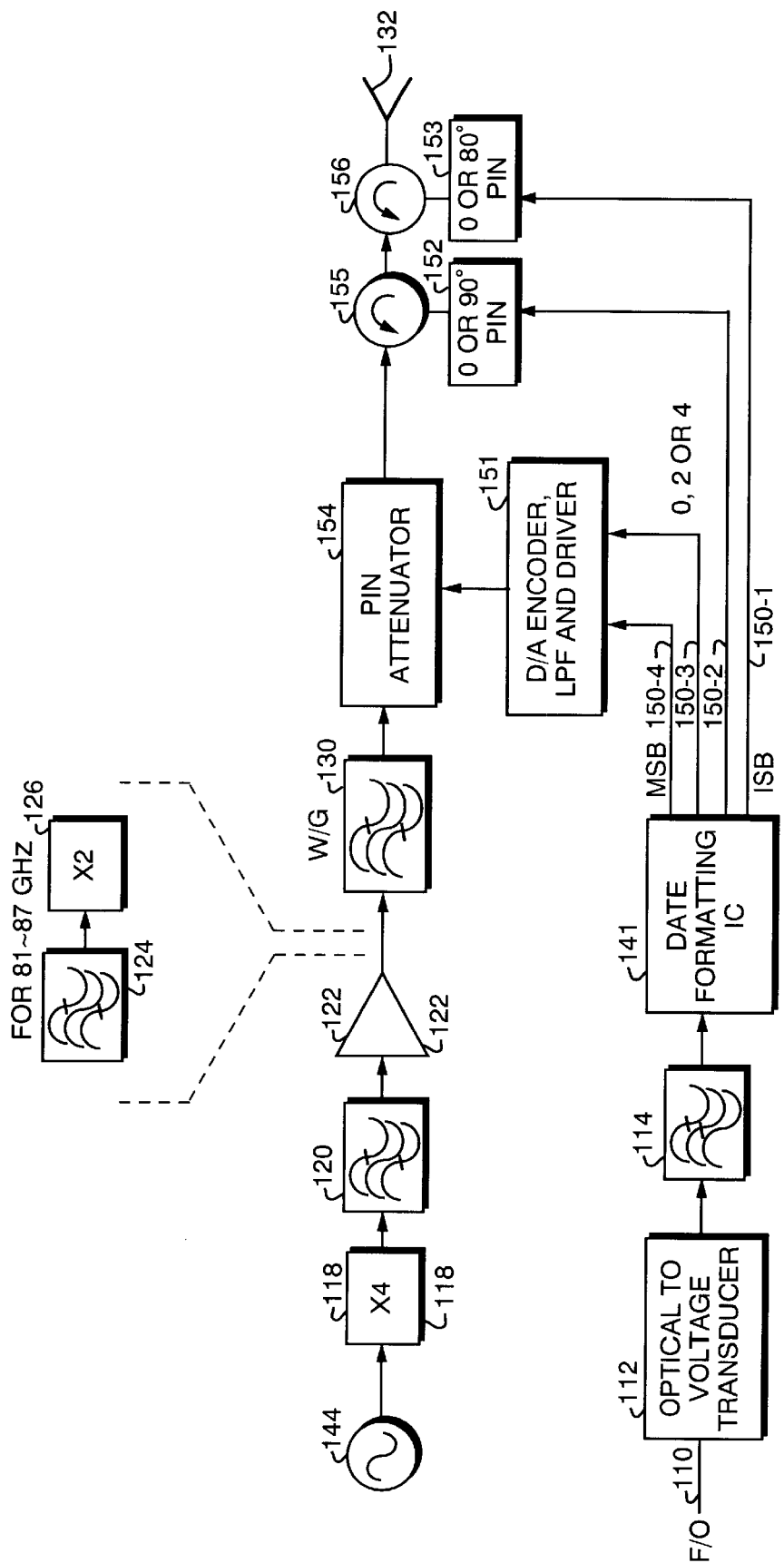
FIG. 3 is a detailed circuit diagram of another embodiment of a Direct Modulation transmitter.

Another embodiment of the present invention that may be used to generate a Quadrature Amplitude Modulated (QAM) output signal is shown in FIG. 3. The QAM implementation represents a generalization of the QPSK case, as QAM provides a way for the amplitude of the transmitted signal to also communicate information as well as the phase. As seen in FIG. 3, this configuration also receives the input optical signal 110 and feeds it to an optical to voltage transducer 112, filter 114, and data formatting integrated circuit 141 as for QPSK. However, with a QAM implementation, the modulation technique is somewhat different. Rather than only phase-modulate the carrier before multiplication, amplitude modulation is also introduced.

Thus, the data formatting integrated circuit 141 provides other data outputs 150-3 and 150-4 that represent encoded data bits. In the illustrated embodiment, this may be a total of as many as four different data bits represented by 16 different states of the modulated carrier. In the case where four data bits are selected, then the implementation provides for sixteen level QAM signalling at the output. The two most significant bits are used to determine a modulated signal amplitude. The two least significant bits a modulated signal phase as for the QPSK case.

The D/A converter 151 may thus include a digital to analog conversion process for generating an analog voltage from the two most significant data bits 150-3 and 150-4. The voltage output from this D/A converter 151 drives the PIN attenuator 154. The PIN attenuator 154 attenuates the signal amplitude output from the waveguide filter 130 by a desired amount as indicated by the data bits 150.

Turning attention now to FIG. 4, an exemplary receiver 160 for the PSK signals generated by the circuit of FIGS. 2 or 3 will be described in detail. The receiver 160 includes a receive antenna 161, an input waveguide filter 162, a low-noise amplifier 164, a bandpass filter 166, a local reference generator 170, a phase demodulator 171, a pair of lowpass filters 182-1, 182-2, a pair of buffer amplifiers 184-1, 184-2, a pair of analog to digital (AD) converters 186-1, 186-2, a data formatting integrated circuit 189 and a voltage to optical transducer 190.

The input signal provided by the receiver antenna 161 is fed to the waveguide filter 162. This filter, having a center frequency in the 50 or 85 GHz range as the case may be, filters the desired signal from the surrounding background signals.

The low-noise amplifier 164 may be implemented as a Monolithic Microwave Integrated Circuit (MMIC) feeding a planar bandpass filter 166 in the 50 or 85 GHz range. The low-noise amplifier 164 typically has a 6–8 decibel (dB) noise figure providing 10–20 decibels of gain.

The local oscillator reference generator 170 consists of a 10–13 GHz oscillator 167, frequency multiplier 168, and bandpass filter 169. These components are identical to the corresponding components in the transmitter. Note here that the multiplication factor 168 may be implemented by one or more individual frequency multipliers although only a single block is shown in the diagram.

The phase demodulator 171 includes a pair of image reject mixers 172-1 and 172-2 offset in quadrature by the phase shifter 174. As is well known in the art, the heterodyning of a local reference signal as generated by the reference oscillator 170 when mixed against the incoming signal from the antenna 161 will produce an in-phase (I) and quadrature (Q) versions of the input signal. The lowpass filters 182-1 and 182-2 provide the baseband information to a pair of respective buffer amplifiers 184-1, 184-2. Thus the resulting signal is the basic 55.52 MHz information that was phase modulated onto the microwave frequency carrier. In a case where the information is coded as QPSK, each signal output by the buffer amplifier may actually represent two different bits. The respective A/D converters 186-1 and 186-2 thus perform the required two-bit conversion. The data formatting IC 189 then reformats this data to be fed to the optical to voltage transducer 190.

The oscillator 167 may receive an error correction signal from the data formatting IC. In such an instance, a phase locked oscillator 167 is provided, in a manner which is well known in the art.

Different implementations of QAM modulators would require different implementations of A/D converters 186. For example, if binary phase shift keying (BPSK) is implemented the A/D converters 186 require only a single bit conversion; if however, if 8 level QAM is implemented by such for example the circuit of FIG. 3, then three bit A/D converters would be necessary. Likewise, if the level QAM is used, the AID converts should have at least 4 bit accuracy.

The invention, therefore, provides for direct modulation of the input bitstream utilizing Continuous Phase Shift Keying. No manipulation of the bitstream is required such as in the case of baseband modulation. Furthermore, because of the direct up-conversion to the desired microwave frequency carrier, multiple heterodyne stages are eliminated. Heterodyne stages, while providing for efficient filtering topologies, create interference and spurious noise problems, as well as increased cost in overall implementation.

By modulating the carrier source, such as provided by a voltage-control oscillator at a phase deviation less than the desired ultimate deviation rate by a factor of 1/n, with n being the multiplication factor in the up-conversion chain, the overall design is greatly simplified. Standard microwave component building blocks can be used in a highly-producible assembly as a result.

While this invention has been particularly shown and described with references to preferred embodiments thereof, it will be understood by those skilled in the art that various changes in form and details may be made therein without departing from the scope of the invention encompassed by the appended claims.

What is claimed is:

1. A transport to microwave radio frequency adapter that accepts an input telecommunications transport signal on an input port and converts information in such signal to a desired microwave Radio Frequency (RF) carrier, the input transport signal carrying information at an input bit rate, the apparatus comprising:

a phase encoder, coupled to receive the transport signal, the phase encoder implementing a Phase Shift Keyed (PSK) encoding such that at least first phase is selected to indicate a first logical value for an input data bit in the transport signal and a second phase is selected to indicate a second logical value for an input data bit in the transport signal, the deviation between the two phases selected to be equal to a predetermined value;

a local reference oscillator, connected to provide a first microwave carrier;

a frequency multiplier, connected to receive the output of the local reference oscillator and to multiply the output thereof to a desired microwave RF carrier frequency; and a phase modulator, connected to receive the desired microwave RF carrier and the phase encoder output, to provide a direct phase modulated microwave RF carrier.

2. An apparatus as in claim 1 wherein the telecommunications transport signal is provided on an optical physical medium.

3. An apparatus as in claim 2 additionally comprising:

an optical-to-voltage transducer connected to receive the telecommunications signal and to provide a baseband electrical signal at an output.

4. An apparatus as in claim 1 wherein the frequency multiplier implements a multiplication factor.

5. An apparatus as in claim 4 wherein the frequency multiplier is implemented in a plurality of frequency multiplication stages.

6. An apparatus as in claim 1 wherein the phase modulator and frequency multiplier perform a direct phase conversion of the input transport signal to the microwave RF carrier.

7. An apparatus as in claim 6 wherein the direct conversion is performed without using the input transport signal to modulate an intermediate carrier signal.

8. An apparatus as in claim 1 additionally comprising:

a microwave bandpass filter connected to the output of the frequency multiplier to filter harmonics of the carrier frequency of the voltage-controlled oscillator.

9. An apparatus as in claim 1 additionally comprising:

a microwave RF to transport adapter, to convert a received microwave RF signal to a transport signal carrying an output telecommunications transport signal.

10. An apparatus as in claim 9 wherein the microwave RF to transport adapter further comprises:

an oscillator, operating at a carrier frequency which is a predetermined fraction of a desired direct down-conversion frequency;

a frequency multiplier, connected to receive the oscillator output, and to multiply the oscillator output up to the desired direct down-conversion frequency; and a mixer, coupled to the frequency multiplier and the microwave RF signal, to provide a down-converted transport signal.

* * * * *